(12) United States Patent
Shrum, Jr. et al.

(10) Patent No.: US 9,003,452 B2
(45) Date of Patent: Apr. 7, 2015

(54) SYSTEMS, METHODS, AND APPARATUS FOR RECORDING BROADBAND CONTENT

(75) Inventors: Edgar V. Shrum, Jr., Smyrna, GA (US); John Civiletto, Suwanee, GA (US)

(73) Assignee: Cox Communications, Inc., Atlanta, GA (US)

(*) Notice: Subject to any disclaimer, the term of this patent is extended or adjusted under 35 U.S.C. 154(b) by 524 days.

(21) Appl. No.: 12/952,618

(22) Filed: Nov. 23, 2010

(65) Prior Publication Data
US 2012/0131629 A1    May 24, 2012

(51) Int. Cl.
| H04N 5/445 | (2011.01) |
| H04H 60/32 | (2008.01) |
| G06F 3/00 | (2006.01) |
| G06F 13/00 | (2006.01) |
| H04N 21/262 | (2011.01) |
| H04N 21/2747 | (2011.01) |
| H04N 21/458 | (2011.01) |

(52) U.S. Cl.
CPC ..... *H04N 21/26233* (2013.01); *H04N 21/2747* (2013.01); *H04N 21/4583* (2013.01)

(58) Field of Classification Search
USPC .................................................. 725/14, 58
See application file for complete search history.

(56) References Cited

U.S. PATENT DOCUMENTS

| 2007/0104456 A1* | 5/2007 | Craner .......................... 386/83 |
| 2009/0249394 A1* | 10/2009 | Schwesinger et al. .......... 725/39 |
| 2010/0131989 A1* | 5/2010 | Casimere ........................ 725/62 |

* cited by examiner

*Primary Examiner* — Ricky Chin
(74) *Attorney, Agent, or Firm* — Sutherland Asbill & Brennan LLP

(57) ABSTRACT

Systems, methods, and apparatus for recording broadband content are provided. A user command to record desired content included in broadband content output by a service provider may be received by a programming processing component configured to receive the output broadband content. The programming processing component may determine whether the desired content will be recorded by the programming processing component. If it is determined that the desired content will be recorded by the programming processing component, then the desired content may be stored by the programming processing component in at least one memory. If it is determined that the desired content will not be recorded by the programming processing component, then a request to record the desired content may be communicated by the programming processing component to a content recording server.

21 Claims, 6 Drawing Sheets

SYSTEMS, METHODS, AND APPARATUS FOR RECORDING BROADBAND CONTENT

FIELD OF THE INVENTION

Aspects of the invention relate generally to recording broadband content, and more particularly, to multi-stream recording of broadband content utilizing both local and network resources.

BACKGROUND OF THE INVENTION

A wide variety of service providers, such as cable providers and satellite providers, provide broadband communications services, such as television services, to customers. Additionally, many customers utilize digital video recording ("DVR") devices to record live broadcast content for subsequent viewing. These DVR devices are typically dedicated devices that are situated within a customer's home, and the DVR devices allow users to schedule programming content for recording. However, the hardware resources of the DVR devices are limited. Accordingly, a customer is only allowed to record a certain volume of content utilizing the DVR devices. Additionally, the number of simultaneous recordings that may be accomplished is limited. For example, a typical DVR device may only be capable of recording one or a few television shows at a time Accordingly, improved systems, methods, and apparatus for facilitating the recording of broadband content are desirable.

BRIEF DESCRIPTION OF THE INVENTION

Some or all of the above needs and/or problems may be addressed by certain embodiments of the invention. Embodiments of the invention may include systems, methods, and apparatus for recording broadband content. In one embodiment, a programming processing component that facilitates recording of broadband content may be provided. The programming processing content may include at least one communications interface, at least one user interface, and at least one processor. The at least one communications interface may be configured to receive broadband content output by a service provider. The at least one user interface may be configured to receive a user command to record desired content included in the output broadband content. The at least one processor may be configured to (i) determine whether the desired content will be recorded by the programming processing component and (ii) direct, if it is determined that the desired content will be recorded by the programming processing component, the storage of the desired content in at least one memory, or (iii) direct, if it is determined that the desired content will not be recorded by the programming processing component, communication of a request to record the desired content to a content recording server via a network.

In accordance with another embodiment of the invention, a method for recording broadband content may be provided. A user command to record desired content included in broadband content output by a service provider may be received by a programming processing component configured to receive the output broadband content. The programming processing component may determine whether the desired content will be recorded by the programming processing component. If it is determined that the desired content will be recorded by the programming processing component, then the desired content may be stored by the programming processing component in at least one memory. If it is determined that the desired content will not be recorded by the programming processing component, then a request to record the desired content may be communicated by the programming processing component to a content recording server.

In accordance with yet another embodiment of the invention, a recording server may be provided. The recording server may include at least one communications interface and at least one processor. The at least one communications interface may be configured to (i) receive a first request to record desired broadband content on behalf of a customer of a service provider and (ii) receive, from a programming processing component associated with the customer, a second request to access the desired content. The first request may be generated based upon a determination that the desired content will not be recorded locally by a device associated with the customer. The at least one processor may be configured to (i) direct, based at least in part upon the first request, storage of the desired content in one or more suitable memory devices, (ii) access, based at least in part upon the second request, the stored content, and (iii) direct the at least one communications interface to communicate the accessed content to the programming processing component.

Additional systems, methods, apparatus, features, and aspects may be realized through the techniques of various embodiments of the invention. Other embodiments and aspects of the invention are described in detail herein with reference to the description and to the drawings and are considered a part of the claimed invention.

BRIEF DESCRIPTION OF THE DRAWINGS

Reference will now be made to the accompanying drawings, which are not necessarily drawn to scale, and wherein.

DETAILED DESCRIPTION

Figure 1:
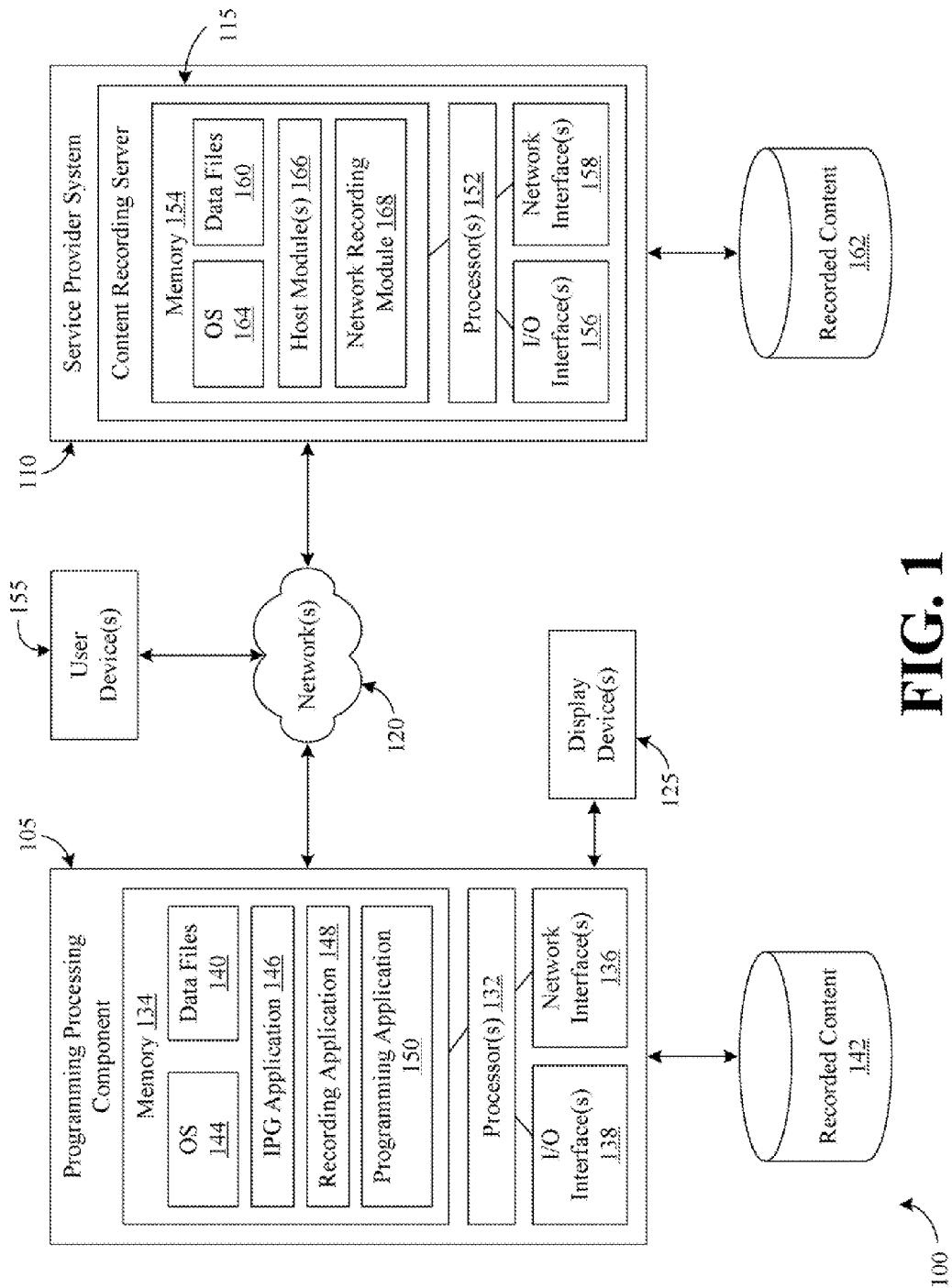
FIG. 1 illustrates a block diagram of an example system that may be utilized to facilitate the recording of desired content, according to an illustrative embodiment of the invention.

Embodiments of the invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Embodiments of the invention may include systems, methods, and apparatus for facilitating the recording of desired broadband content utilizing local resources, such as a customer premise set-top box, and/or network-based resources, such as resources provided by a content recording server associated with a broadband service provider. In certain embodiments; a customer premise device, such as a cable set-top box or a satellite set-top box, may be associated with a customer, and the customer premise device may include at least one communications interface configured to receive broadband content output by a service provider. The output broadband content may include content included in a normal broadcast stream (e.g., television content that is output by the service provider for receipt by a plurality of customers) and/ or content that has been recorded by the service provider on behalf of a customer.

Additionally, the programming processing component may include at least one user interface configured to receive a user command to record desired content, such as broadband content that is currently being output by the service provider or broadband content that will be output at a subsequent point in time. In certain embodiments, the user command may be received via an interactiye program guide that is output by the programming processing component for presentation to the user. Once a user command to record desired content has been received, the received command may be processed by at least one processor or processing component associated with the customer premise device. In certain embodiments, the at least one processor may be configured to determine whether the desired content will be recorded locally by the programming processing component or whether a request to record the desired content should be communicated to a content recording server associated with the service provider. If it is determined that the desired content will be recorded by the programming processing component, then the customer premise device may locally record the desired content utilizing any number of suitable memory devices associated with the customer premise device. If, however, it is determined that the desired content will not be recorded by the programming processing component, then the at least one processor may direct the communication of a request to record the desired content to the content recording server via any number of suitable networks, such as a cable network or a satellite network.

In certain embodiments, the at least one processor may be configured to direct the storage of information associated with a received user command in a recording queue. For example, user commands to record one or more television shows may be stored in a recording queue. Based at least in part upon the stored information, a point in time at which the desired content should be recorded may be identified. During subsequent processing of information included in the recording queue, the at least one processor may determine whether desired content will be recorded locally or whether a recording request will be communicated to the content recording server. This processing may be completed either at the recording time or at another point in time prior to reaching the recording time. As an alternative to storing information in a recording queue, user commands to record content may be processed in real-time or near real-time by the at least one processor.

A wide variety of suitable methods and/or techniques may be utilized in order to determine whether desired content will be recorded locally by the programming processing component or whether a recording request will be communicated to the content recording server. For example, in certain embodiments, one or more recording parameters associated with the programming processing component may be evaluated in order to determine whether desired content will be recorded locally. Any number of recording parameters may be evaluated as desired in various embodiments of the invention, such as a current status of local recording resources, an identification of future pending recording requirements, a bandwidth available for performing local recording, one or more estimates of future bandwidth requirements, a type of broadcast stream associated with the desired content (e.g., whether the content is available in broadcast or a simultaneous data and voice channel), and/or a determination of when the recorded content will likely be requested for viewing by the user.

In the event that a determination is made to request network recording of the desired content by the content recording server, a recording request identifying the desired content, user, and/or programming processing component may be communicated by the programming processing component to a content recording server via one or more suitable networks, such as a cable network or a satellite network. The content recording server may receive and process the request. During the processing of the received request, the content recording server may determine whether network resources for recording the desired content are available. If resources are not available, a suitable error message may be communicated to the programming processing component. If, however, sufficient network resources are available for the recording, then the content recording server may schedule a recording of the desired content. For example, information associated with the desired content, such as an identifier of the desired content and/or a point in time at which the content should be recorded, may be stored in a recording queue, and the desired content may be recorded at the appropriate point in time.

Additionally, in certain embodiments, the content recording server may generate a unique identifier for the desired content, and the content recording server may communicate the generated unique identifier to the programming processing component. For example, the unique identifier may be communicated to the programming processing component in a response to a received request to record the desired content. The unique identifier may facilitate subsequent access of the recorded content by the programming processing component. For example, the unique identifier may include a location identifier or bookmark that indicates a memory location or block of memory at which the recorded content is stored.

In certain embodiments, the at least one communication interface of the programming processing component may be configured to receive a response to a communicated recording request, and the at least one processor may be configured to process the received response in order to identify and/or store the unique identifier. The programming processing component may further be configured to utilize the unique identifier to generate a request for the desired content and to direct the communication of the request to the content recording server. The request for the desired content may be received by the content recording server, and the desired content may be communicated from the content recording server to the programming processing component in response to the request. In certain embodiments, the content recording server may communicate an indication that the desired content has been recorded to the programming processing component. A request for the desired content may then be generated by the programming processing component in response to receiving an indication that the recording has been completed.

In other embodiments, a passive downloading process for the desired content may be initiated by the programming processing component. In other words, the programming processing component may determine an appropriate point in time to download the desired content from the content recording server. As desired, any number of download parameters may be evaluated in order to determine a point in time at which to request and/or download the desired content. Examples of suitable download parameters that may be evaluated include, but are not limited to, a time of day, an available bandwidth, a type of download, an availability of local resources associated with the programming processing component, a type of download to be performed, and/or a determination of when the recorded content will likely be viewed by the user. In this regard, desired content may be communicated from the content recording server to the programming processing component without a user requesting the communication or download.

In yet other embodiments, the desired content may be downloaded from the content recording server to the programming processing component based upon the receipt of a user request to access the desired content. In certain embodiments, a dynamic video on demand ("VOD") session may be initiated between the programming processing component and the content recording server, and the desired content may be downloaded and output for presentation to the user in real-time or near real-time. For example, a VOD session may be initiated based upon a determination that sufficient network bandwidth is available to support the session. As desired, during a dynamic VOD session, the desired content may additionally be stored by the programming processing component for future playback purposes. In other embodiments, a dynamic VOD session may not be available, and a suitable message may be output by the programming processing component for presentation to the user. The message may include an indication that the desired content is not currently available locally and, as desired, an estimate of a point at time at which the desired content will be available. The desired content may subsequently be downloaded to the programming processing component and made available to the user.

System Overview

An example system 100 for facilitating the recording of desired content will now be described illustratively with respect to FIG. 1. The system 100 may include, for example, a programming processing component 105 and/or a service provider system 110. Additionally, a content recording server 115 or content recording system may be associated with the service provider system 110. Any number of suitable networks 120 may facilitate communications between various components of the system 100. Additionally, as desired, one or more components of the system 100 may be processor-driven components or devices. In certain embodiments, certain components of the system 100 may be combined. For example, a content recording server 115 may be incorporated into a service provider system 110.

With reference to FIG. 1, a programming processing component 105 may be a suitable device or component that facilitates the receipt, processing, and/or output of at least one broadband signal, such as a broadband cable signal or a broadband satellite signal. Additionally, the programming processing component 105 may facilitate the receipt and processing of user requests to record desired content, such as user requests to record desired content that will be broadcast at a subsequent point in time (e.g., upcoming television content, etc.). In certain embodiments, the programming processing component 105 may be a customer premise device or component that is situated within a customer's household or other structure associated with the customer. The programming processing component 105 may include suitable hardware and/or software components capable of receiving and processing a broadband signal (e.g., a cable signal, satellite signal, etc.) output by a service provider system 110, such as a cable service provider system or a satellite service provider system. Examples of suitable programming processing components include, but are not limited to, a set-top box ("STB") (e.g., a cable STB, a digital satellite STB, an Internet Protocol Television STB, etc.), a virtual STB, an embedded STB, etc.

In certain embodiments, the programming processing component 105 may be connected to one or more display devices 125, such as a television, associated with a customer. In other embodiments, the programming processing component 105 may be embedded, incorporated into, and/or executed on the display device 125. In operation, the programming processing component 105 may receive at least a portion of a broadband data signal output by the service provider system 110, and the programming processing component 105 may convert at least a portion of the received signal into content which is displayed or otherwise output by the display device 125. Additionally, the programming processing component 105 may be configured to record or store at least a portion of the received broadband content. As desired, the programming processing component 105 may receive a broadband data signal via any number of suitable service provider networks 120, such as a cable network that includes any number of optical fibers, coaxial cables, and/or cable drops, a satellite network that includes a suitable satellite dish and/or connecting cables, and/or other suitable networks. Additionally, any number of intermediary devices, such as broadband modems, routers, etc., may be situated between the service provider system 110 and the programming processing component 105.

As desired, the broadband signal provided to the programming processing component 105 may include a wide variety of data components, including but not limited to, a television signal, a digital television signal, data associated with a VoIP telephone service, data associated with Internet service, data associated with home monitoring services, etc. The programming processing component 105 may receive and process the broadband signal. As desired, the programming processing component 105 may selectively output a portion of the broadband signal, such as digital television data (e.g., audio and/or video data), electronic program guide data, various Web pages, etc., to the display device 125 for display. Additionally, in certain embodiments, the programming processing component 105 may selectively store received content in one or more suitable memory devices for subsequent output for presentation to a customer or user via the display device 125. Any number of suitable connections and/or connecting devices, such as coaxial cables, High-Definition Multimedia Interface ("HDMI") cables, etc., may be utilized to connect the programming processing component 105 to the display device 125. Additionally, in certain embodiments, the programming processing component 105 may output audio data to any number of audio components, such as a home theater system, stereo system, etc.

The programming processing component 105 may be a suitable processor-driven device that facilitates the receipt, processing, and/or output of a broadband signal. Additionally, the programming processing component 105 may be a suitable processor-driven device that facilitates the receipt and processing of user commands to record desired content. As such, the programming processing component 105 may include any number of computing devices, such as a personal computer, a digital assistant, a personal digital assistant, a digital tablet, an Internet appliance, an application-specific circuit, a microcontroller, a minicomputer, or any other processor-based device. The execution of suitable computer-implemented instructions or computer-executable instructions by the programming processing component 105 may form a special purpose computer or other particular machine that is operable to facilitate the recording of desired content and/or the processing and output of broadband content.

With reference to FIG. 1, the programming processing component 105 may include one or more processors 132, one or more memory devices 134, one or more transceivers and/or network interfaces 136, and/or one or more input/output ("I/O") interfaces 138. The processors 132 may be configured to execute any number of software applications and/or computer-readable or computer-executable instructions. The memory devices 134 may include any number of suitable memory devices, such as caches, read-only memory devices, random access memory devices, flash memory devices, magnetic storage devices, removable storage devices (e.g., memory cards, etc.), etc. The memory devices 134 may include internal memory devices and/or external memory devices in communication with the programming processing component 105. The memory devices 134 may store data, executable instructions, and/or various program modules utilized by the processors 132. Examples of data that may be stored by the memory devices 134 include data files 140, recorded content 142, and/or any number of suitable program modules that may be executed by the processors 132, such as an operating system ("OS") 144, an interactive program guide ("IPG") application 146, a recording application 148, and/or a programming application 150.

The data files 140 may include any suitable data that facilitates the operation of the programming processing component 105, the processing of a received broadband signal, the receipt of recording requests, the processing of recording requests, and/or the recording of desired content. For example, the data files 140 may include, but are not limited to, user profile information, information associated with requests to record desired content, information associated with the content recording server 115, information associated with desired content recorded by the content recording server 115, and/or information associated with retrieving desired content from the content recording server 115. The recorded content 142 may include desired content that has been recorded by the programming processing component 105 and/or desired content that has been recorded by the content recording server 115 and downloaded to the programming processing component 105. For example, the recorded content 142 may include video and/or audio content recorded by the programming processing component 105 or a local recording device (e.g., a digital video recording device, a second programming processing component 105, etc.) in communication with the programming processing component 105. As another example, the recorded content 142 may include desired content that has been recorded by the content recording server 115 and communicated from the content recording server 115 to the programming processing component 105. Additionally, the recorded content 142 may be stored in one or more internal memory devices (e.g., internal hard drives, internal flash drives, etc.) of the programming processing component 105 and/or in one or more external memory devices accessible by the programming processing component 105.

The OS 144 may be a suitable software module that controls the general operation of the programming processing component 105. The OS 144 may also facilitate the execution of other software modules, for example, the IPG application 146, the recording application 148, and/or the programming application 150. The IPG application 146 may be a suitable software module that facilitates the processing of program guide information received by the programming processing component 105. For example, electronic program guide ("EPG") information may be included in a broadband signal received by the programming processing component 105. The IPG application 146 may format at least a portion of the received EPG data for presentation to a customer via an IPG grid. For example, received EPG data may be parsed and organized by channel and time slot. The organized data may then be formatted for display in an IPG grid. For example, based upon the receipt of a user command or request for IPG data, such as a selection of a remote control button or option associated with requesting guide data, the IPG application 146 may direct the output of the IPG grid for presentation to the customer via the display device 125.

Once presented, a user may navigate through a displayed IPG grid in order to view scheduled content, such as current and upcoming television content. For example, the user may utilize a remote control to navigate through the IPG grid. As desired, the user may utilize the IPG grid to request the recording of desired content. For example, the user may select an individual entry included in the grid, and the user may request that the content associated with the grid entry be recorded. A recording request made by the user may be received by the IPG application 146 and provided to the recording application 148.

The recording application 148 may be a suitable software module that facilitates the recording of desired content. In operation, the recording application 148 may receive a user command or request to record desired content, and the recording application 148 may determine whether the desired content will be recorded locally by the programming processing component 105 or whether a request to record the desired content will be communicated to the content recording server 115. In certain embodiments, a user command to record desired content may be received via a user's interaction with an IPG grid. In other embodiments, a user command to record desired content may be received via one or more suitable network communications. For example, a user may utilize a suitable user device 155 (e.g., a personal computer, a mobile device, etc.) to access a Web-based application hosted by the service provider system 110, and the user may request, via the Web-based application, that desired content be recorded. The service provider system 110 may then communicate the recording request to the programming processing component 105 via one or more suitable networks 120, such as a service provider network. As yet another example, a user may utilize a user device 155 to directly access an application hosted by the programming processing component 105 (e.g., the recording application), and a user command to record desired content may be communicated to the programming processing component 105. For example, a wireless communications session (e.g., a Bluetooth communications session, a Wi-Fi communications session, etc.) may be established between a user device 155 and the programming processing component 105, and a recording request may be received via the established communications session.

Once a user command to record desired content has been received, the recording application 148 may determine whether the content will be recorded locally or whether a request to record the content will be communicated to the content recording server 115. In certain embodiments, an information associated with the desired content may be stored in a recording queue. For example, an identifier of the desired content and/or a time at which the content should be recorded (e.g., a broadcast or airing time of the desired content) may be stored in a recording queue. The recording application 148 may access information included in the recording queue and determine an appropriate method for recording the desired content (i.e., local or network recording). A determination of an appropriate recording method may be made either at the recording time or at any point prior to the recording time (e.g., approximately five minutes prior to the recording time, approximately 10 minutes prior to the recording time, etc.).

As desired, the recording application 148 may evaluate a wide variety of parameters and/or rules in order to determine whether desired content will be recorded locally or whether a recording request will be communicated to the content recording server 115. Examples of recording parameters that may be analyzed include, but are not limited to, a current status of local resources (e.g., whether other content is currently being recorded locally), future pending recording requirements (e.g., whether other content is scheduled for local recording), a bandwidth available to perform local recording (e.g., a number of content items that may be simultaneously recorded), an estimate of future bandwidth requirements, a type of broadcast stream or type of content associated with the desired content (e.g., a broadcast stream, simultaneous data and voice channel, narrowcast, unicast, etc.), and/or a determination of when the recorded content will likely be requested for viewing by the user. Any number of parameters and/or rules may be evaluated as desired in various embodiments. Additionally, various weightings may be provided to the various parameters. As desired, a historical behavior of the user may also be utilized in conjunction with evaluating the recording parameters. For example, a determination may be made based at least in part upon historical behavior that a user is likely to view first content scheduled for recording prior to second content scheduled for recording. Based at least in part upon this determination, the first content may be scheduled for local recording, and the second content may be scheduled for network recording.

If the recording application 148 determines that desired content should be recorded locally, then the recording application 148 may schedule the local recording of the desired content. Once the recording time for the desired content has been reached, the recording application 148 may direct the storage of the desired content in one or more suitable memory devices associated with the programming processing component 105. In this regard, the desired content may be locally stored for subsequent access by the user. If, however, the recording application 148 determines that the content will not be recorded locally, then the recording application 148 may generate a request for network recording resources, and the recording application 148 may communicate the request to the content recording server 115. A wide variety of information may be included in the request, such as an identifier of the programming processing component 105, an identifier of the desired content, an identifier of the user, and/or a recording time. Following the communication of the request to the content recording server 115, the recording application 148 may receive one or more responses to the request. For example, the recording application 148 may receive an indication that the request has been received and/or an indication of whether a network recording of the desired content has been authorized to be performed. In the event that a network recording has been authorized by the content recording server 115, a unique identifier associated with the recorded content may be communicated to the recording application 148 by the content recording server 115. The unique identifier may include information that facilitates subsequent retrieval of the recorded content by the recording application 148, such as information identifying a block of memory at which the recorded content is stored and/or access credentials for downloading the recorded content. The unique identifier may be communicated by the content recording server 115 either before the recording has been completed or after the recording has been completed. As desired, the recording application 148 may utilize the unique identifier and/or any required access credentials to generate a request to download the recorded content from the content recording server 115. Based upon the generated request, the desired content may be communicated from the content recording server 115 to the programming processing component 105 via one or more suitable networks 120, and the desired content may be stored locally in one or more memory devices associated with the programming processing component 105.

A wide variety of suitable methods and/or techniques may be utilized as desired by the recording application 148 to download recorded content from the content recording server 115. As one example, a passive downloading process may be utilized by the recording application 148 to request a download of the recorded content. In this regard, the desired content may be downloaded to the programming processing component 105 in a background process that is transparent to the user. As desired, a wide variety of download parameters may be evaluated by the recording application 148 in order to determine when to download the desired content. Examples of suitable download parameters that may be evaluated include, but are not limited to, a time of day, an available bandwidth for downloading content, a type of download to be performed (e.g., video on demand session, narrowcast, unicast, etc.), an availability of local resources associated with the programming processing component 105, and/or a determination of when the recorded content will likely be viewed by the user. As desired in various embodiments, a wide variety of different types of download sessions may be utilized to download desired content to one or more programming processing components 105. Examples of suitable types of download sessions include background sessions (e.g., trickle download sessions, etc.), real-time download sessions, and/or faster than real-time download sessions. Additionally, as desired, historical behavior may be evaluated in conjunction with the download parameters. As a result of evaluating the download parameters, the recording application 148 may determine an appropriate time to download the desired content. For example, the desired content may be downloaded at a time when sufficient network bandwidth is available, such as late at night or while a user is likely at work or school. As another example, if it is determined that a user will likely request viewing of the desired content before a certain time, attempts may be made to download the desired content prior to reaching the time at which the content will likely be requested.

As another example of downloading content, the recording application 148 may request a download based upon the receipt of a user command or request to download and/or view the content. For example, in certain embodiments, an indication or message indicating that the content has been recorded by the content recording server 115 may be output for presentation to the user. In response to the output indication or message, the user may request that the content be downloaded. In other embodiments, a user request to view the desired content may be received. Once the request to view the desired content has been received, the recording application 148 may initiate a download of the desired content. As desired, an appropriate error message indicating that the content is being downloaded and is currently not available for viewing may be output for presentation to the user. In certain embodiments, the output message may additionally include an estimated time at which the download will be completed or an estimated time period required for the download.

Additionally, in certain embodiments, the recording application 148 may determine whether a dynamic download session may be initiated to permit download of the desired content and approximately simultaneous presentation of the downloaded content in real-time or near-real time. For example, the recording application 148 may determine whether network resources are available to initiate a dynamic download session. A dynamic download session may be similar to a video on-demand session. If it is determined that a dynamic download session is available, then the desired content may be streamed to the programming processing component 105 by the content recording server 115, and the desired content may be output for presentation to the user. In certain embodiments, the initiation of a dynamic download session may be a background operation that is transparent to the user. Additionally, as desired, the downloaded content may be stored by the programming processing component 105 in one or more suitable memory devices.

A wide variety of suitable operations may be performed by the recording application 148 to facilitate the recording of desired content. The operations described above are provided by way of example only. Another example of the operations that may be performed by the recording application 148 is described in greater detail below with reference to FIGS. 2A, 2B, and 3.

With continued reference to FIG. 1, the programming application 150 may be a suitable software module that facilitates the processing and/or output of received broadband content and/or stored broadband content. For example, the programming application 150 may be configured to format at least a portion of a received broadband signal and/or at least a portion of stored content for output by the programming processing component 105 and presentation via the one or more display devices 125. A wide variety of content may be formatted for output by the programming application 150 as desired in various embodiments of the invention including, but not limited to, television content, audio content, VoIP telephone content, electronic program guide data, Internet and/or Web site content, etc. Additionally, the programming application 150 may be configured to receive and process user commands associated with the output of content. For example, the programming application 150 may be configured to process user commands received via remote control input and/or user voice commands.

With continued reference to the programming processing component 105, the one or more I/O interfaces 138 may facilitate communication between the programming processing component 105 and one or more input/output devices, for example, one or more user interface devices, such as a remote control, display, keypad, mouse, pointing device, control panel, touch screen display, microphone, speaker, etc., that facilitate user interaction with the programming processing component 105. In this regard, user commands may be received by the programming processing component 105. The one or more network interfaces 136 may facilitate connection of the programming processing component 105 to one or more suitable networks 120, such as service provider networks or broadband networks (e.g., a cable network or a satellite network) and/or local area networks (e.g., a Bluetooth-enabled network, a Wi-Fi enabled network, etc.). in this regard, the programming processing component 105 may receive a broadband signal for processing and output. Additionally, the programming processing component 105 may communicate commands and/or requests to the service provider system 110 and/or the content recording server 115, and the programming processing component 105 may receive commands and/or information from the service provider system 110 and/or the content recording server 115. Additionally, as desired, the programming processing component 105 may communicate with any number of user devices 155 via one or more local area networks.

With continued reference to FIG. 1, each of the one or more display devices 125 may be any suitable device configured to receive content output by the programming processing component 105 and to present at least a portion of the content to one or more users. Examples of suitable display devices 125 include, but are not limited to, televisions, monitors, and/or stereo systems.

With continued reference to FIG. 1, the service provider system 110 may include any number of systems and/or devices that facilitate the output of a broadband signal for receipt by any number of programming processing components. For example, the service provider system 110 may include systems associated with a cable service provider, a satellite service provider, or other service provider. In operation, the service provider system 110 may receive content from one or more content providers, format content for output in a broadband signal, and/or output the broadband signal. Examples of suitable systems that may be associated with the broadband source include, but are not limited to, a service provider head-end component, a conditional access system controller, any number of encryption devices, an electronic program guide data server, an on-demand server, a pay-per-view purchase server, etc.

According to an aspect of the invention, the service provider system 110 may include or be associated with a content recording server 115 that facilitates network recording of desired content. In this regard, the recording capabilities extended to customers of the service provider may be expanded beyond those provided by local systems alone. For example, a potentially unlimited number of simultaneous recordings may be requested by a user and made on behalf of the user utilizing both local and network resources. As a result, the consumer experience may be enhanced.

The content recording server 115 may be a suitable processor-driven device configured to receive and process requests to record desired content. Examples of suitable processor-driven devices that may be utilized as a content recording server 115 include, but are not limited to, a server computer, a personal computer, a digital assistant, a personal digital assistant, a digital tablet, an Internet appliance, an application-specific circuit, a microcontroller, a minicomputer, any other processor-based device, and/or any combination of processor-driven devices. The execution of suitable computer-implemented instructions or computer-executable instructions by the content recording server 115 may form a special purpose computer or other particular machine that is operable to facilitate the receipt of requests to record desired content, the processing of received recording requests, the recording of desired content, and/or the communication of recorded content to one or more programming processing components 105.

In addition to one or more processors 152, the content recording server 115 may include one or more memory devices 154, one or more input/output ("I/O") interfaces 156, and/or one or more network interfaces 158. The processors 152 may be configured to execute any number of software applications and/or computer-readable or computer-executable instructions. The memory devices 154 may include any number of suitable memory devices, such as caches, read-only memory devices, random access memory devices, flash memory devices, magnetic storage devices, etc. The memory devices 154 may store data, executable instructions, and/or various program modules utilized by the processors 152. Examples of data that may be stored by the memory devices 154 include data files 160 and/or recorded content 162. Additionally, the memory devices 154 may be configured to store any number of suitable program modules that may be executed by the processors 152, such as an operating system ("OS") 164, one or more host modules 166, and/or a network recording module 168.

The data files 160 may include any suitable data that facilitates the operation of the content recording server, the receipt of recording requests, the processing of recording requests, the recording of desired content, and/or the communication of recorded content to one or more programming processing components 105. For example, the data files 160 may include, but are not limited to, information that facilitates communication with any number of programming processing components 105, information associated with received recording requests, unique identifiers generated in association with recording requests, and/or information that facilitates the receipt of recording requests from one or more user devices 155. The recorded content 162 may include desired content that has been recorded by the content recording server 115 and/or associated identification information (e.g., an identifier of one or more requesting programming processing components, etc.). For example, the recorded content 162 may include video and/or audio content recorded by the content recording server 115. Additionally, the recorded content 162 may be stored in one or more internal memory devices (e.g., internal hard drives, internal flash drives, etc.) of the content recording server 115 and/or in one or more external memory devices accessible by the content recording server 115.

The OS 164 may be a suitable software module that controls the general operation of the content recording server 115. The OS 164 may also facilitate the execution of other software modules by the processors 152, for example, the one or more host modules 166 and/or the network recording module 168. The one or more host modules 166 may be suitable software modules that facilitate the establishment of a communications session with one or more programming processing components 105 and/or one or more user devices 155. In this regard, the content recording server 115 may receive one or more requests for recording desired content. For example, recording requests may be received over a service provider network (e.g., a cable network, a satellite network, etc.) from a programming processing component 105 via a communications session established by a host module 166. As another example, a host module 166 may facilitate the establishment of a network session, such as a Web-based network session, with a user device 155 (e.g., a personal computer, a mobile device, etc.). During the established network session, a user request to record desired content may be received from the user device 155. In certain embodiments, the received request may be forwarded by the host module 166 to a programming processing component 105 associated with the user of the user device 155. In other embodiments, the request may be processed by the network recording module 168 to facilitate network recording.

The network recording module 168 may be a suitable software module that facilitates the processing of recording requests, the recording of desired content, and the distribution of desired content to one or more programming processing components 105. In operation, the network recording module 168 may receive a request to record desired content, and the network recording module 168 may determine whether resources are available to perform a network recording of the desired content. If it is determined that network resources are not available, then an appropriate error message may be generated and returned to a requesting device. If, however, it is determined that network resources are available to record the desired content, then the desired content may be scheduled for recording by the network recording module 168. For example, an identifier of the desired content and/or a recording time for recording the desired content may be added to a recording queue. In certain embodiments, a determination may be made as to whether another user has requested recording of the desired content. If it is determined that multiple users have requested the content to be recorded, then a single entry in a recording queue may be associated with each of the users. In this regard, duplicate recordings may be avoided.

Once a recording time (e.g., broadcast time, airing time, etc.) for recording the desired content has been reached, the network recording module 168 may direct the storage of the desired content in one or more suitable memory devices. Additionally, the network recording module 168 may generate a unique identifier (e.g., a memory location identifier, a bookmark, a pointer, etc.) and/or access credentials that may be utilized by one or more programming processing components 105 to download or obtain the desired content. The network recording module 168 may communicate the unique identifier and/or access credentials to any number of programming processing components 105 associated with user requests for the desired content. In certain embodiments, the unique identifier may be communicated prior to the completion of the recording and, as desired, another message may be communicated to one or more programming processing components 105 to indicate that the recording has been completed. In other embodiments, the unique identifier may be communicated following the completion of the recording.

The network recording module 168 may additionally be configured to process requests received from programming processing components 105 to download recorded content. If a received request is a request to download content via a dynamic download session, then the network recording module 168 may determine whether network resources are available to establish a dynamic download session. If resources are available, then the network recording module 168 may establish the dynamic download session to download the content. If resources are not available or if the request is not a request for a dynamic download session, then the network recording module 168 may evaluate one or more download parameters in order to determine whether the content may be downloaded to the requesting programming processing component 105. In this regard, the network recording module 168 and/or the programming processing component 105 may identify and/or schedule a time at which the content will be downloaded. Once a download has been completed, the network recording module 168 may determine whether the recorded content should continue to be stored by the content recording server 115. For example, the network recording module 168 may determine whether the recorded content should be maintained for one or more other users. In the event that the network recording module 168 determines that the content should no longer be stored, the network recording module 168 may direct the deletion of the recorded content.

A wide variety of suitable operations may be performed by the network recording module 168 as desired in various embodiments of the invention. The operations described above are provided by way of example only. Another example of the operations that may be performed by the network recording module 168 is described in greater detail below with reference to FIGS. 4A-4B.

With continued reference to the content recording server 115, the one or more I/O interfaces 156 may facilitate communication between the content recording server 115 and one or more input/output devices, for example, one or more user interface devices, such as a display, keypad, mouse, pointing device, control panel, touch screen display, remote control, microphone, speaker, etc., that facilitate user interaction with the content recording server 115. In this regard, user commands may be received by the content recording server 115. The one or more network interfaces 158 may facilitate connection of the content recording server 115 to one or more suitable networks 120, for example, a broadband network or service provider network (e.g., a cable network, a satellite network, etc.) that facilitates communication with programming processing components 105 and/or one or more networks that facilitate communications with any number of user devices 155 (e.g., the Internet, etc.).

As desired in certain embodiments, any number of user devices 155 may be utilized as desired in various embodiments of the invention. Examples of user devices 155 include, but are not limited to, personal computers, mobile devices, Internet appliances, etc. A user device 155 may be a suitable process-driven device that permits a user to access one or more applications that allow the user to view available content and request recording of desired content. For example, a user may utilize a user device 155 to access a Web server, such as a Web server associated with the service provider system 110, that permits the user to request recordings. Certain components of a user device 155 may be similar to the components described above for the programming processing components 105. For example, the user device 155 may include any number of suitable processors, memory devices, I/O interfaces, and/or network interfaces.

Communications between various components of the system 100 may be facilitated via any number of suitable networks 120, such as one or more service provider networks (e.g., a cable network, a satellite network, etc.) and/or other networks. The networks 120 may include any telecommunication and/or data networks, whether public, private, or a combination thereof, including but not limited to, a local area network, a wide area network, an intranet, the Internet, public switched telephone networks, satellite networks, cable networks, and/or any combination thereof and may be wired and/or wireless.

Those of ordinary skill in the art will appreciate that the system 100 shown in and described with respect to FIG. 1 is provided by way of example only. Numerous other operating environments, system architectures, and device configurations are possible. Other system embodiments can include fewer or greater numbers of components and may incorporate some or all of the functionality described with respect to the system components shown in FIG. 1.

Operational Overview

Figure 2A:
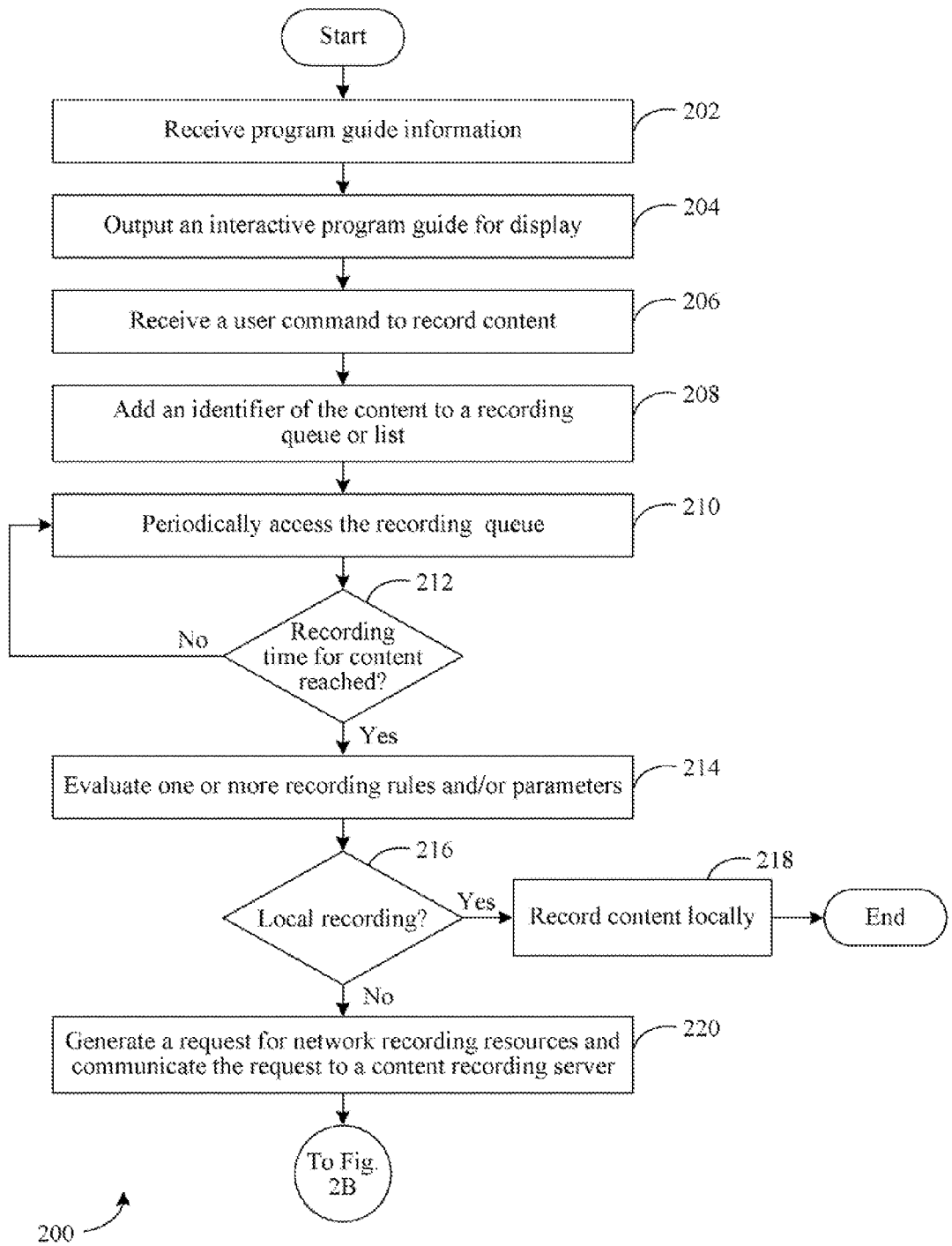
FIGS. 2A-2B illustrate a flow diagram of the example operations that may be performed by a programming processing component to facilitate the recording of desired content, according to an illustrative embodiment of the invention.
Figure 2B:
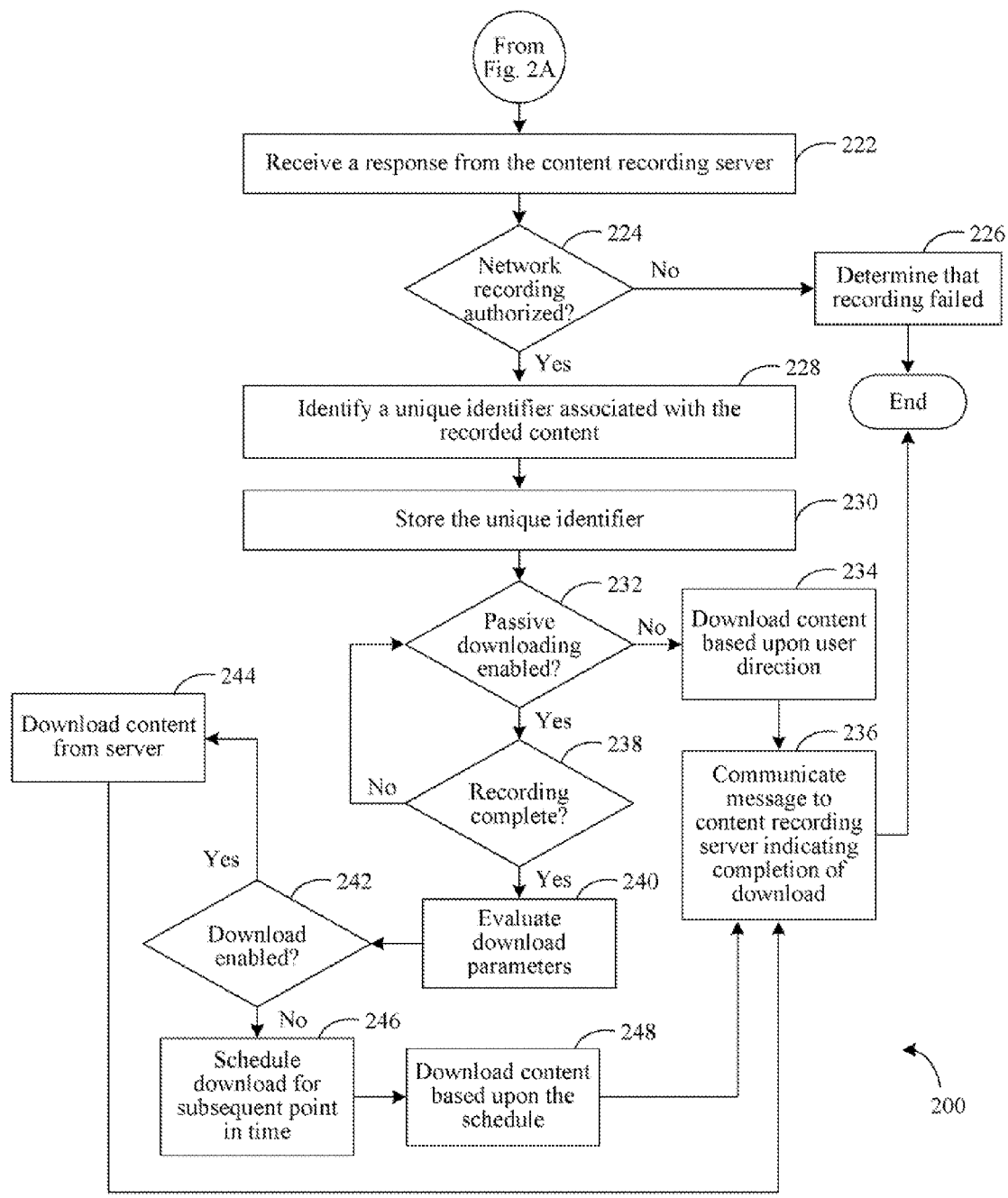

FIGS. 2A and 2B illustrate a flow diagram of an example method 200 that may facilitate the recording and/or receipt of desired content by a programming processing component, such as the programming processing component 105 illustrated in FIG. 1. In certain embodiments, the method 200 may be performed by a suitable IPG application and/or recording application associated with a programming processing component, such as the IPG application 146 and/or recording application 148 illustrated in FIG. 1. The method 200 may begin at block 202.

At block 202, program guide information, such as electronic or interactive program guide information, may be received by a programming processing component 105. For example, IPG information may be included in a broadband signal received by the programming processing component 105. At block 204, at least a portion of the received IPG information may be utilized to generate an IPG display, such as an IPG grid, and the IPG display may be output for presentation or display to a user of the programming processing component 105. In certain embodiments, the IPG display may be output in response to a received user request for the IPG display. Once the IPG display has been output, a user may navigate through the IPG display, and the user may select desired content to be recorded. In this regard, a user command to record desired content may be communicated to the programming processing component, and the user command may be received at block 206.

At block 208, which may be optional in certain embodiments of the invention, information associated with the desired content associated with the received user command may be added to a recording queue or recording list. For example, an identifier of the desired content and/or a recording time for the desired content may be added to a recording queue. The recording queue may be periodically accessed at block 210, and the stored information associated with the desired content may be retrieved from the recording queue. At block 212, a determination may be made as to whether a recording time for the content has been reached or whether the recording time will be reached in the near future. If it is determined at block 212 that the recording time has not been reached, then operations may continue at block 210 described above. If, however, it is determined at block 212 that the recording time has been reached or will soon be reached, then operations may continue at block 214, and one or more recording rules and/or parameters may be evaluated in order to determine whether the desired content will be recorded locally or whether network recording will be requested. As an alternative to maintaining a recording queue, the operations at block 214 may also be executed once a user command to record desired content is received.

At block 214, one or more recording rules and/or parameters may be evaluated in order to determine whether the desired content will be recorded locally or whether network recording will be requested. As desired, any number of suitable parameters may be evaluated. Examples of suitable parameters that may be evaluated include, but are not limited to, a current status of local resources (e.g., whether other content is currently being recorded locally by the programming processing component 105 or other local device), future pending recording requirements (e.g., whether other content is scheduled for local recording during a similar time frame), a bandwidth available to perform local recording (e.g., a number of content items that may be simultaneously recorded by the programming processing component 105 and/or other local devices), an estimate of future bandwidth requirements, a type of broadcast stream associated with the desired content (e.g., a broadcast stream, simultaneous data and voice channel, etc.), and/or a determination of when the recorded content will likely be requested for viewing by the user. Additionally, as desired, various weightings may be provided to the various parameters. In certain embodiments, a historical behavior of the user may also be utilized in conjunction with evaluating the recording parameters. For example, a determination may be made based at least in part upon historical behavior that a user is likely to view first content scheduled for recording prior to second content scheduled for recording. Based at least in part upon this determination, the first content may be scheduled for local recording, and the second content may be scheduled for network recording. In certain embodiments, the programming processing component may default to local recording, and a network recording may be requested if local resources will not support the recording.

At block 216, a determination may be made as to whether the desired content should be recorded locally. In other words, a determination may be made as to whether the evaluation process performed at block 214 indicates that the desired content should be recorded locally. If it is determined at block 216 that the desired content should be recorded locally, then operations may continue at block 218. At block 218, the programming processing component 105 may schedule and/or initiate the local recording of the desired content. Once the recording time for the desired content is reached, the programming processing component 105 or another local device associated with the programming processing component 105 (e.g., a second programming processing component, an external DVR, etc.) may direct the storage of the desired content in one or more suitable memory devices accessible by the programming processing component 105. In this regard, the desired content may be locally stored for subsequent access by the user.

If, however, it is determined at block 216 that the desired content should not be recorded locally, then operations may continue at block 220. At block 220, a request for network recording resources to facilitate recording of the desired content may be generated. As desired, a wide variety of different types of information may be included in a generated request for network recording resources, such as an identifier of a programming processing component 105, identification information and/or access credentials for a user of the programming processing component 105, an identifier of the desired content, and/or a recording time for the desired content. Once generated, the request may be communicated to an appropriate content recording server associated with a service provider, such as the content recording server 115 illustrated in FIG. 1. The request may be communicated via any number of suitable service provider networks, such as a cable network or a satellite network.

At block 222, one or more responses to the communicated request may be received by the programming processing component 105 from the content recording server 115. A received response may include information indicating whether or not desired content has been authorized for recording by the content recording server 115. In other words, a received response may include an indication of whether appropriate resources are available to facilitate a network recording and/or whether the programming processing component 105 is authorized to request a recording of the desired content (e.g., whether a subscription level for a user authorizes the recording, whether authentication information for a user authorizes the recording, etc.). Additionally, in the event that a network recording is authorized and/or performed, a received response may include information that facilitates a subsequent download of the desired content from the content recording server. For example, a received response may include a unique identifier and/or access credentials that facilitate a subsequent download of the desired content. In certain embodiments, a unique identifier may include one or more pointers to or may otherwise identify one or more memory locations at which the desired content has been stored by the content recording server 115.

At block 224, a determination may be made by the programming processing component 105 as to whether a network recording of the desired content has been authorized. For example, one or more messages received from the content recording server 115 may be analyzed in order to determine whether a network recording has been authorized. If it is determined at block 224 that a network recording has not been authorized, then operations may continue at block 226, and a determination may be made that the desired content failed to record or has not been authorized to record. As desired, one or more suitable error messages indicating the failure to authorize and/or record the desired content may be output by the programming processing component 105 for presentation to a user. Operations of the method 200 may then end following block 226. If, however, it is determined at block 224 that a network recording has been authorized, then operations may continue at block 228. At block 228, a unique identifier and/or other information associated with the recorded content may be identified by the programming processing component 105. As desired, the unique identifier and/or other information may be stored in one or more suitable memory devices at block 230.

At block 232, a determination may be made as to whether passive downloading of desired content that has been stored by the content recording server 115 is enabled and/or authorized for the programming processing component 105. For example, stored user preferences and/or device permissions for downloading content may be analyzed in order to determine whether the content should be passively downloaded. If it is determined at block 232 that passive downloading is not enabled, then operations may continue at block 234. At block 234, the programming processing component 105 may wait for a user command or user request to download desired content, and the desired content may be downloaded based upon receipt of a user request for the content. In certain embodiments, the desired content may be downloaded via a dynamic download session. In other embodiments, the desired content may be downloaded in a background process. In either case, the desired content may be stored by the programming processing component 105 in one or more suitable memory devices. Additionally, as desired in certain embodiments, the programming processing component 105 may communicate an appropriate message to the content recording server 115 at block 236 in order to indicate when the download process has been completed. In this regard, the content recording server 115 may determine whether the download was successful and/or whether the desired content may be deleted from memory associated with the content recording server 115. Additionally, at block 236, any identification information for the network recording stored by the programming processing component 105 (e.g., a unique identifier) may be deleted. Operations may then end following block 236.

If, however, it is determined at block 232 that passive downloading is enabled, then operations may continue at block 238. At block 238, a determination may be made as to whether the recoding has been completed by the content recording server 115. For example, a determination may be made as to whether a message has been received indicating that the recording has been completed. As another example, a determination may be made as to whether a time that is indicative of the end of the desired content has been reached. If it is determined at block 238 that the recording has not been completed, then operations may continue at block 232, and the programming processing component 105 may wait for the recording to be completed. Alternatively, the programming processing component 105 may attempt to download at least a portion of the desired content that has been recorded. This download process may be similar to the process utilized to download a completed recording; however, multiple downloads may be requested in order to obtain all of the desired content. If, however, it is determined at block 238 that the recording has been completed by the content recording server, then operations may continue at block 240.

At block 240, the programming processing component 105 may conduct an evaluation to determine one or more appropriate points in time and/or time periods at which the desired content should be downloaded to the programming processing component 105 in a background process. For example, one or more download parameters and/or rules may be evaluated in order to determine whether a download of the desired content is enabled. A wide variety of suitable download parameters may be evaluated as desired in various embodiments of the invention. Examples of suitable download parameters that may be evaluated include, but are not limited to, a time of day, a day of the week, an available bandwidth, an availability of local resources associated with the programming processing component, and/or a determination of when the recorded content will likely be viewed by the user. Additionally, in certain embodiments, historical user behavior (e.g., viewing history) may be analyzed and/or evaluated in conjunction with the download parameters. As a result of evaluating the parameters, a determination may be made as to whether a download should be initiated and/or whether a download should be scheduled for a subsequent point in time. For example, to preserve computing and network resources, a determination may be made that desired content should be downloaded during periods of time with relatively low network traffic and/or during periods of time in which a user does not typically watch television (e.g., late at night, while a user is typically at work, etc.). As another example, if a user typically views a desired program during a certain time period (e.g., between 8:00 p.m. and 10:00 p.m.), then a determination may be made that the desired content should be downloaded before the beginning of the time period.

At block 242, a determination may be made as to whether a download has been enabled for the desired content. In other words, a determination may be made as to whether a download of the desired content should be initiated. if it is determined at block 242 that a download of the desired content has been enabled, then operations may continue at block 244. At block 244, a request to download the content may be communicated to the content recording server and, if the request is granted, the desired content may be downloaded from the server to the programming processing component 105. If the request is not granted (e.g., sufficient network resources are not available for the download), then the programming processing component 105 may attempt to download the content at a subsequent point in time. Once received, the programming processing component 105 may direct the storage of the desired content in one or more suitable memory devices associated with the programming processing component 105. Operations may then continue at block 236 described above.

If however, it is determined at block 242 that a download of the desired content has not been currently enabled (or if a download attempt is unsuccessful), then operations may continue at block 246. At block 246, a download of the desired content may be scheduled for a subsequent point in time. For example, a download may be scheduled for a point in time at which a relatively greater amount of network resources and/or local resources may be available, such as late at night or while a user is typically not at home. Alternatively, a determination may be made that the desired content will be subsequently streamed to the programming processing component 105 and/or communicated in a video on demand session. Operations may then continue at block 248, and the programming processing component 105 may attempt to download the desired content in accordance with the schedule. For example, the programming processing component 105 may request a download of the content once a scheduled download time has been reached. Once a download process has successfully been initiated, the programming processing component 105 may direct the storage of the desired content in one or more suitable memory devices associated with the programming processing component 105. Operations may then continue at block 236 described above.

Although the method 200 describes operations in which the programming processing component 105 determines whether a download of desired content may be performed, in other embodiments of the invention, the content recording server 115 may determine a point in time at which the desired content may be downloaded to the programming processing component 105. In other words, the content recording server 115 may evaluate any number of download parameters in order to determine when the desired content should be pushed to the programming processing component 105.

The method 200 may end following either of blocks 218, 226, or 236.

Figure 3:
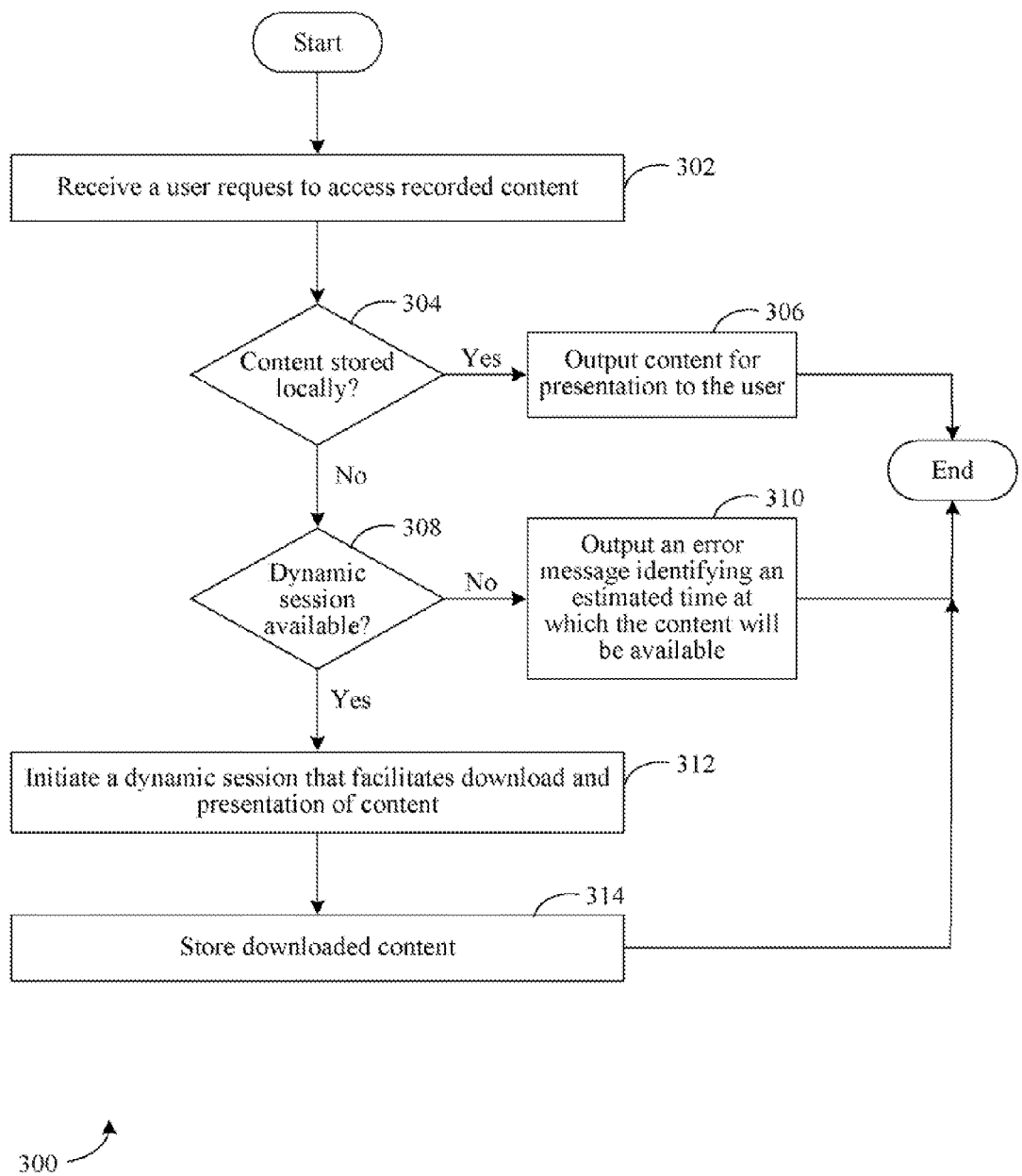
FIG. 3 is a flow diagram of the example operations that may be performed by a programming processing component to present recorded content to a user, according to an example embodiment of the invention.

FIG. 3 is a flow diagram of an example method 300 that may be performed by a programming processing component, such as the programming processing component 105 illustrated in FIG. 1, to facilitate the presentation of recorded content. The operations of the method 300 may be performed by a suitable recording application and/or programming application associated with a programming processing component, such as the recording application 148 and/or programming application 150 illustrated in FIG. 1. The method 300 may begin at block 302.

At block 302, a user request to view, listen to, or otherwise access recorded content may be received by the programming processing component 105. For example, a user may utilize a suitable input device (e.g., a remote control) to access a recording queue, and the user may request presentation of previously recorded content. In certain embodiments, the location of the recorded content may not be presented to the user. In other words, a user may not be presented with information indicating whether the recorded content is stored locally or on the network. In other embodiments, location information may be presented or displayed to the user.

Once a user request to access recorded content has been received at block 302, operations may continue at block 304. At block 304, a determination may be made as to whether the desired content has been stored locally by the programming processing component 105. If it is determined at block 304 that the desired content has been stored locally, then operations may continue at block 306. At block 306, the locally stored content may be accessed by the programming processing component 105, formatted for output, and output for presentation to the user via any number of suitable presentation and/or display devices. Operations may then end following the output of the content at block 306.

If, however, it is determined at block 304 that the content is not stored locally, then operations may continue at block 308. At block 308, a determination may be made as to whether a dynamic download session is available for downloading the desired content from the content recording server 115. For example, local resources, network resources, and/or available bandwidth may be evaluated in order to determine whether a dynamic download is available. Additionally, in certain embodiments, the type of content may be evaluated in order to determine whether a dynamic download is available. For example, given a certain amount of bandwidth, a dynamic download of high definition content may not be available whereas a download of other content is available. Additionally, in certain embodiments, a request for a dynamic download may be communicated to the content recording server 115, and the content recording server 115 may determine whether a dynamic download is available. The programming processing component 105 may then make a determination as to whether a dynamic download is available based at least in part upon a received response to the request to the event that a dynamic download session is available, a dynamic download session may facilitate both the download of content that has been completely recorded by the content recording server 115 and/or content that has only partially been recorded (e.g., the recording is still in progress).

If it is determined at block 308 that a dynamic download session is not available, then operations may continue at block 310. At block 310, an error message may be generated and output for presentation to the user. As desired, the error message may include an indication that the desired content is currently not available and/or an estimated time at which the content will be available (e.g., a point in time at which the content will likely be available or an estimated period of time, such as ten minutes, needed for the download. Operations may then end following block 310.

If, however, it is determined at block 308 that a dynamic download session is available, then operations may continue at block 312. At block 312, a dynamic download session may be initiated. During the download session, the desired content may be streamed to the programming processing component 105 by the content recording server 115. As the desired content is received, the content may be formatted for output and presentation in real-time or near real-time. In certain embodiments, the streaming and presentation of content may be similar to a conventional video on-demand session. Additionally, as desired, the received content may be locally stored at block 314 for subsequent access by the user. Operations may end following block 314.

The method 300 may end following either of blocks 306, 310, or 314.

Figure 4A:
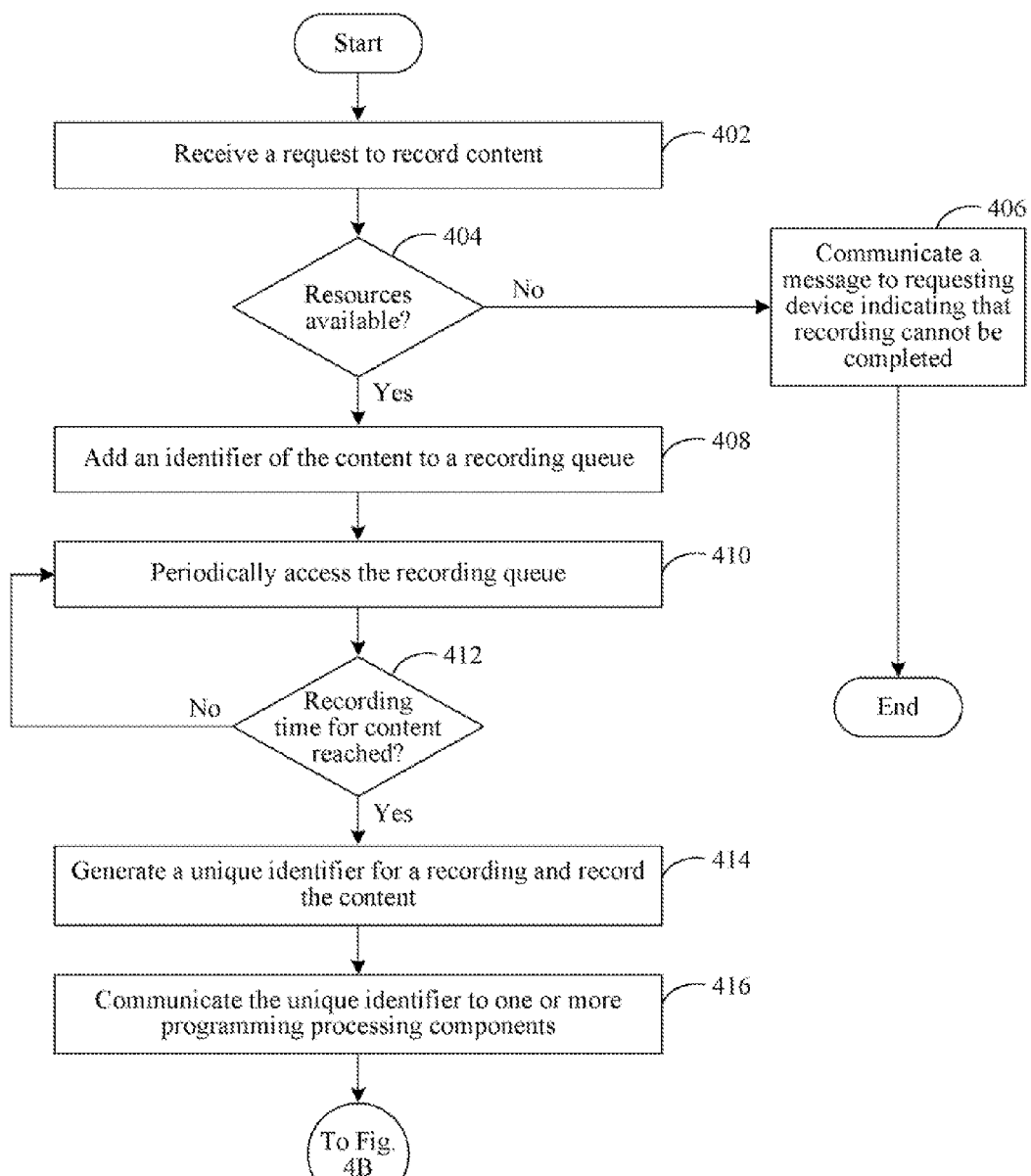
FIGS. 4A-4B is a flow diagram of the example operations that may be performed by a content recording server to facilitate the recording of desired content, according to an example embodiment of the invention.
Figure 4B:
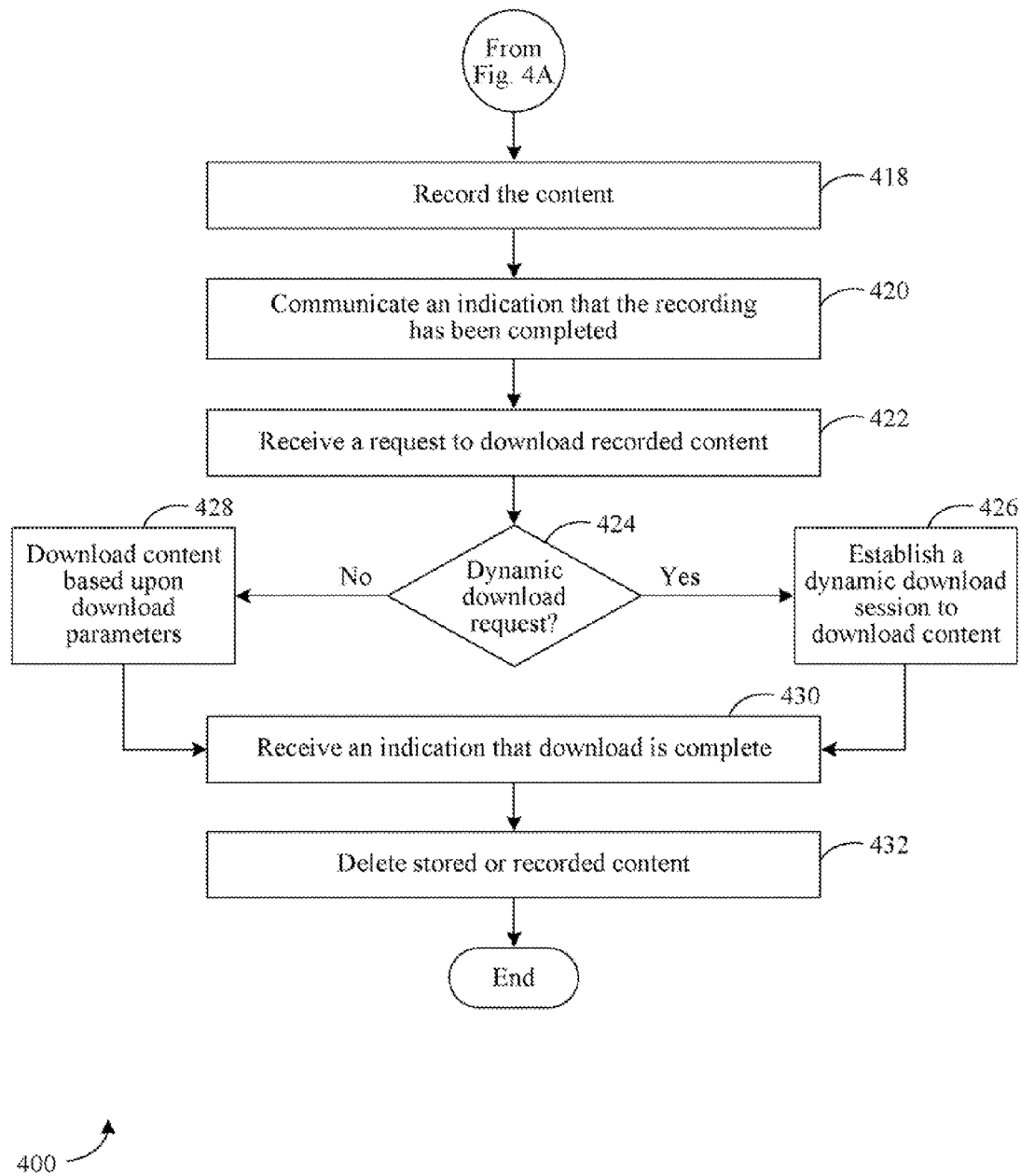

FIGS. 4A and 4B illustrate a flow diagram of an example method 400 that may be performed by a content recording server, such as the content recording server 115 illustrated in FIG. 1, to facilitate the network recording of desired content. The operations of the method 400 may be performed by a suitable host module and/or network recording module associated with a programming processing component, such as the host module 166 and/or network recording module 168 illustrated in FIG. 1. The method 400 may begin at block 402.

At block 402, a request to record desired content may be received by the content recording server 115. In certain embodiments, the request may be received from a suitable programming processing component, such as the programming processing component 105 illustrated in FIG. 1. In other embodiments, the request may be received from a suitable user device, such as the user device 155 illustrated in FIG. 1. As desired, a wide variety of different information may be included in a received request, such as an identifier of a programming processing component 105 associated with a user, user identification information, identification information for desired content, and/or a recording time associated with the desired content.

At block 404, a determination may be made as to whether network resources are available for recording the desired content. If it is determined at block 404 that resources are not available for recording the desired content, then operations may continue at block 406, and an appropriate message may be communicated to the requesting device indicating that the network recording cannot be accommodated or completed. Operations may then end following block 406. If, however, it is determined at block 404 that sufficient resources are available to complete a network recording of the desired content, then operations may continue at block 408.

At block 408, an identifier associated with the desired content may be added to a recording queue associated with the content recording server 115. In this regard, a subsequent recording of the desired content may be scheduled and/or facilitated. A wide variety of suitable information may be stored in the recording queue as desired in various embodiments, including but not limited to, an identifier of the desired content, a recording time associated with the desired content, an identifier of a user that requested the desired content to be recorded, and/or an identifier of a programming processing component 105 that requested the recording or that is associated with the user. Additionally, in certain embodiments, a determination may be made as to whether a previous request to record the desired content, such as a request received from a different user, has been added to the recording queue. If it is determined that a previous entry for the desired content was added to the recording queue, then the previous entry may be modified to include information associated with the new user and/or programming processing component 105. In this regard, desired content may be recorded by the content recording server 115 and provided to multiple users that requested the recording.

At block 410, the recording queue may be periodically accessed in order to facilitate the recording of desired content. For example, the recording queue may be accessed every fifteen minutes, every thirty minutes, or at another appropriate time interval in order to identify desired content that should be recorded. A determination may be made at block 412 as to whether a recording time for desired content (e.g., a broadcast or airing time for the desired content) has been reached. If it is determined at block 412 that a recording time has not been reached, then operations may continue at block 410 described above. If, however, it is determined at block 412 that a recording time for desired content has been reached, then operations may continue at block 414.

At block 414, a unique identifier (e.g., a location identifier, pointer, bookmark, etc.) and/or other access information associated with the desired content (e.g., access credentials, etc.) may be generated. The generated information may facilitate a subsequent download of the content by one or more programming processing components 105. For example, the unique identifier may identify one or more memory locations at which the recorded desired content has been stored. Once generated, the unique identifier and/or other access information may be communicated at block 416 by the content recording server 115 to one or more programming processing components 105. Additionally, at block 418, the desired content may be recorded, and the content recording server 115 may direct the storage of the desired content in one or more memory devices associated with the content recording server 115. In certain embodiments, once the recording has been completed, an appropriate message or communication indicating that the recording has been completed may be communicated at block 420 to one or more programming processing components 105.

At block 422, a request to download recorded content may be received by the content recording server 115 from a programming processing component 105. In certain embodiments, a received download request may be a passive download request that is initiated by a programming processing component. In other embodiments, a received download request may be a request that is communicated by the programming processing component 105 in response to a user command received by the programming processing component 105. Additionally, a received request may be a request to download the desired content in a dynamic download session. At block 424, a determination may be made as to whether a received request to download desired content is a request for a dynamic download. If it is determined at block 424 that the received request is a request for a dynamic download, then operations may continue at block 426. At block 426, a determination may be made as to whether a dynamic download session is available. If a dynamic download is available, then a dynamic download session may be initiated by the content recording server 115, and the desired content may be streamed to the programming processing component 105. Operations may then continue at block 430 described below.

If, however, it is determined at block 424 that the received request is not a dynamic download request or if it is determined at block 426 that a dynamic download session is not available, then operations may continue at block 428. At block 428, the desired content may be recorded in a background process. As desired, the download may be based upon an analysis of one or more download parameters by the content recording server 115 and/or the programming processing component 105. For example, the content recording server 115 may determine whether sufficient bandwidth is available to facilitate a download. If sufficient bandwidth is available, then the download may be initiated. Otherwise, a download may be scheduled for a subsequent point in time. Following the download of the desired content at block 428, operations may continue at block 430.

At block 430, which may be optional in certain embodiments, a message may be received from the programming processing component 105 indicating that the download has been completed. In the event that a completion method has not been received within a threshold period of time following the initiation of the download, the content recording server 115 may attempt to restart a download process. Alternatively, the content recording server 115 may communicate a suitable error message to the programming processing component 105.

At block 432, the content recording server 115 may determine whether the stored or recorded content may be deleted from the memory associated with the content recording server 115. For example, a determination may be made as to whether the desired content has been downloaded to each of the programming processing components 105 that requested recording of the content. If it is determined that the desired content should not be downloaded to any additional programming processing components, then the content recording server 115 may delete the stored content. Operations may then end following block 432.

Although the generation and communication of a unique identifier is described in FIG. 4 as occurring prior to the recording of the desired content, in certain embodiments, the unique identifier may be generated and/or communicated either during the recording or after the recording has been completed.

The method 400 may end following either of blocks 406 or 432.

The operations described and shown in the methods 200, 300, and 400 of FIGS. 2-4 may be carried out or performed in any suitable order as desired in various embodiments of the invention. Additionally, in certain embodiments, at least a portion of the operations may be carried out in parallel. Furthermore, in certain embodiments, less than or more than the operations described in FIGS. 2-4 may be performed.

Various block and/or flow diagrams of systems, methods, apparatus, and/or computer program products according to example embodiments of the invention are described above. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a special purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special purpose, hardware-based computer systems that perform the specified functions, elements or steps, or combinations of special purpose hardware and computer instructions.

Many modifications and other embodiments of the invention set forth herein will be apparent having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A programming processing component comprising:
at least one communications interface configured to receive broadband content output by a service provider;
at least one user interface configured to receive a user command to record desired content included in the output broadband content;
at least one memory; and
at least one processor configured to:
store information associated with the user command in a recording queue;
determine, based at least in part on the stored information in the recording queue, that a point in time for recording the desired content has been reached;
determine, at the point in time, that the desired content will not be recorded by the programming processing component, wherein the determining the desired content will not be recorded is based at least in part on an evaluation of when the recorded content will likely be requested for viewing by the user and an evaluation of one or more recording parameters comprising at least a bandwidth available for local recording or an estimate of future bandwidth requirements;

determine, based at least in part on historical data, that a first content scheduled for recording is likely to be viewed prior to a second content scheduled for recording;

direct a communication request to record the desired content to a content recording server via a network;

receive, via the communications interface, a response to the communication request, the response comprising a unique identifier indicating a memory location at which the desired content has been stored on the content recording server;

store the unique identifier in the at least one memory; and request the download of the desired content based at least in part on a determination of when the desired content is likely to be viewed.

2. The programming processing component of claim 1, wherein the user command to record desired content comprises a user selection of the desired content via an interactive program guide output by the programming processing component for presentation to the user.

3. The programming processing component of claim 1, wherein the one or more recording parameters further comprise at least one of (i) a status of local recording resources associated with the programming processing component, (ii) an identification of future recording requirements, or (iii) a type of broadcast stream associated with the desired content.

4. The programming processing component of claim 1, wherein:

the desired content is recorded by the content recording server, the at least one processor is further configured to (i) generate, based at least in part on the stored unique identifier, a second request for the desired content and (ii) direct the at least one communications interface to communicate the second request for the desired content to the content recording server, and the at least one communications interface is further configured to (i) communicate the second request for the desired content and (ii) receive the desired content from the content recording server.

5. The programming processing component of claim 4, wherein:

the at least one communications interface is further configured to receive, from the content recording server, an indication that the desired content has been recorded, and the at least one processor is further configured to generate the second request for the desired content based at least in part upon the received indication.

6. The programming processing component of claim 5, wherein the at least one processor is further configured to generate the second request for the desired content based at least in part on an evaluation of one or more download parameters, the download parameters comprising at least one of (i) a time of day, (ii) an available bandwidth, (iii) an availability of local resources associated with the programming processing component, or (iv) a type of download.

7. The programming processing component of claim 5, wherein:

the at least one user interface is further configured to receive a user request to access the desired content, and the at least one processor is further configured to generate the second request for the desired content based at least in part on the receipt of the user request to access the desired content.

8. The programming processing component of claim 7, wherein the at least one processor is further configured to direct an output of at least a portion of the desired content for presentation prior to the complete receipt of the desired content from the content recording server.

9. The program processing component of claim 1, wherein the unique identifier is generated by the content recording server.

10. A method for recording broadband content, the method comprising:

receiving, by a programming processing component configured to receive broadband content output by a service provider, a user command to record desired content included in the broadband content;

storing information associated with the user command in a recording queue;

determining, based at least in part on the stored information in the recording queue, that a point in time for recording the desired content has been reached;

determining, at the point in time by the programming processing component, that the desired content will not be recorded by the programming processing component, wherein the determining the desired content will not be recorded is based at least in part on an evaluation of when the recorded content will likely be requested for viewing by the user and an evaluation of one or more recording parameters comprising at least a bandwidth available for local recording or an estimate of future bandwidth requirements;

determine, based at least in part on historical data, that a first content scheduled for recording is likely to be viewed prior to a second content scheduled for recording;

communicating, by the programming processing component based at least in part on the determination, a request to a content recording server to record the desired content;

receiving, by the program processing component, a response to the communicated request, the response comprising a unique identifier indicating a memory location at which the desired content has been stored on the content recording server;

storing, by the program processing component, the unique identifier; and requesting, by the program processing component, the download of the desired content based at least in part on a determination of when the desired content is likely to be viewed.

11. The method of claim 10, wherein receiving a user command to record desired content comprises receiving a user selection of the desired content via an interactive program guide output by the programming processing component for presentation to the user.

12. The method of claim 10, further comprises evaluating at least one of (i) a status of local recording resources associated with the programming processing component, (ii) an identification of future recording requirements, or (iii) a type of broadcast stream associated with the desired content.

13. The method of claim 10, wherein the desired content is recorded by the content recording server, and further comprising:

communicating, by the programming processing component to the content recording server, a second request for the desired content, the second request comprising the unique identifier; and receiving, by the programming processing component from the content recording server in response to the second request, the desired content.

14. The method of claim 13, further comprising:

receiving, by the programming processing component from the content recording server, an indication that the desired content has been recorded, wherein communicating a second request for the desired content comprises communicating a second request for the desired content based at least in part upon the received indication.

15. The method of claim 14, wherein communicating a second request for the desired content further comprises:

evaluating, by the programming processing component, one or more download parameters, the download parameters comprising at least one of (i) a time of day, (ii) an available bandwidth, (iii) an availability of local resources associated with the programming processing component, or (iv) a type of download; and communicating the second request for the desired content based at least in part upon the evaluation.

16. The method of claim 14, further comprising:

receiving, by the programming processing component, a user request to access the desired content, wherein communicating a second request for the desired content comprises communicating a second request for the desired content based at least in part on the receipt of the user request to access the desired content.

17. The method of claim 16, further comprising:

outputting, by the programming processing component for presentation, at least a portion of the desired content prior to the complete receipt of the desired content from the content recording server.

18. The method of claim 10, wherein the unique identifier is generated by the content recording server.

19. A recording server comprising:

at least one communications interface configured to (i) receive a first request to record desired broadband content on behalf of a customer of a service provider, wherein the first request is generated based upon a determination, at the point in time at which the desired content is to be recorded, based on historical data, that a first content scheduled for recording is likely to be viewed prior to a second content scheduled for recording, and based at least in part on an evaluation of when the recorded content will likely be requested for viewing by the user, that the desired content will not be recorded locally by a device associated with the customer and (ii) receive, from a programming processing component associated with the customer, a second request to access the desired content, wherein the first request comprises an identifier of the programming processing component associated with a user, user identification information and a recording time associated with the desired content; and at least one processor configured to (i) direct, based at least in part upon the first request, storage of the desired content in one or more suitable memory devices, (ii) generate a unique identifier that indicates a memory location at which the desired content is stored in the one or more memory devices, (iii) direct the at least one communications interface to communicate the unique identifier to the programming processing component (iv) access, based at least in part upon the second request, the desired content, (v) direct the at least one communications interface to communicate the desired content to the programming processing component, and (vi) request the download of the desired content based at least in part on a determination of when the desired content is likely to be viewed.

20. The recording server of claim 19, wherein the desired content is streamed to the programming processing component.

21. The recording server of claim 19, wherein the device and the programming processing component comprise a single device.

* * * * *